Nov. 23, 1937.  L. W. MELCHER  2,099,747
AIR CONDITIONING MEANS
Filed June 4, 1936  8 Sheets-Sheet 1
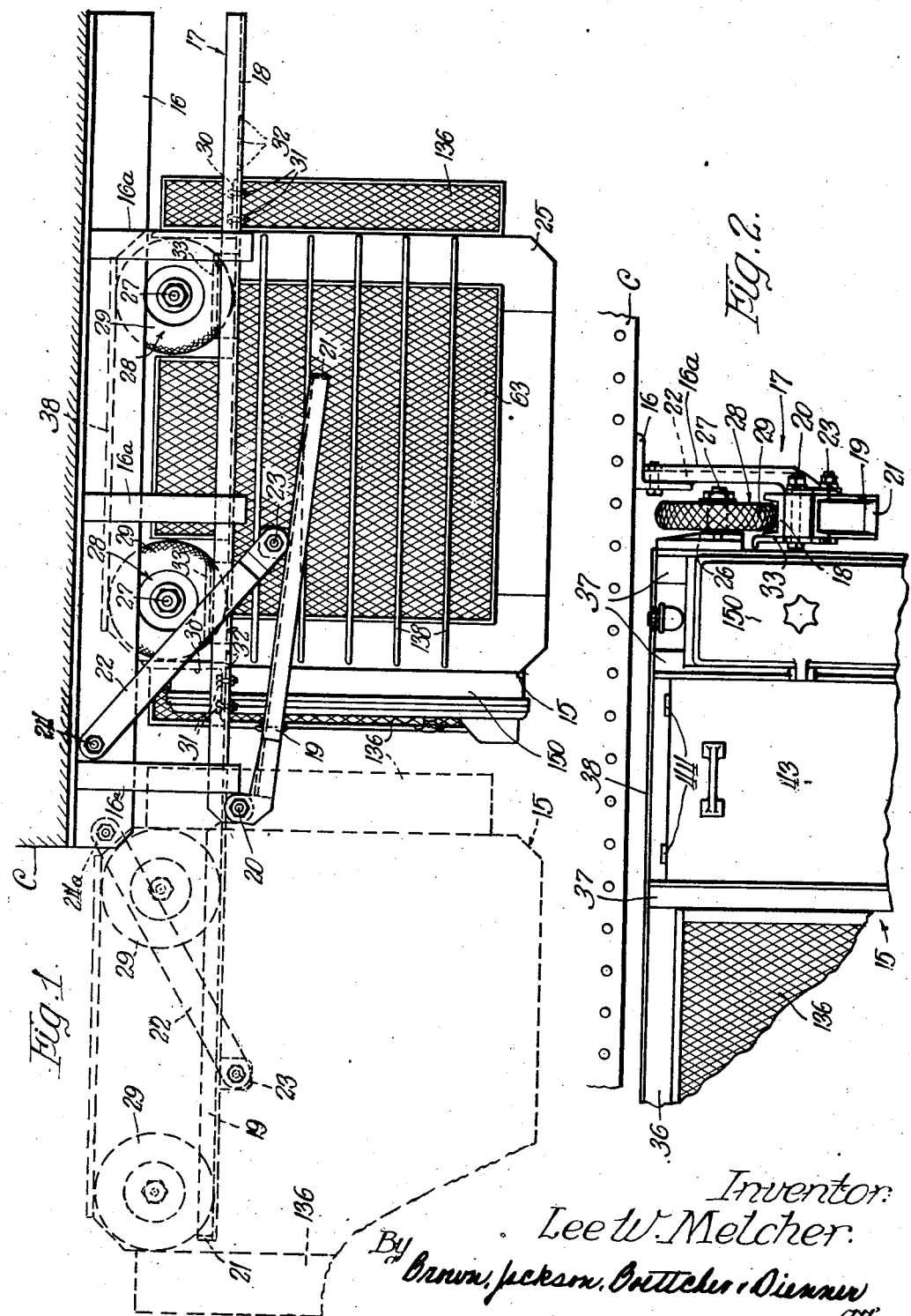
Inventor:
Lee W. Melcher.
By Brown, Jackson, Boettcher & Dienner
Attys.

Nov. 23, 1937.    L. W. MELCHER    2,099,747
AIR CONDITIONING MEANS
Filed June 4, 1936    8 Sheets-Sheet 2

Inventor:
Lee W. Melcher.
By
Brown, Jackson, Boettcher & Dienner
Attys.

Nov. 23, 1937.    L. W. MELCHER    2,099,747
AIR CONDITIONING MEANS
Filed June 4, 1936    8 Sheets-Sheet 3

Inventor:
Lee W. Melcher.
By
Brown, Jackson, Boettcher & Dienner
Attys.

Nov. 23, 1937.  L. W. MELCHER  2,099,747
AIR CONDITIONING MEANS
Filed June 4, 1936   8 Sheets-Sheet 4
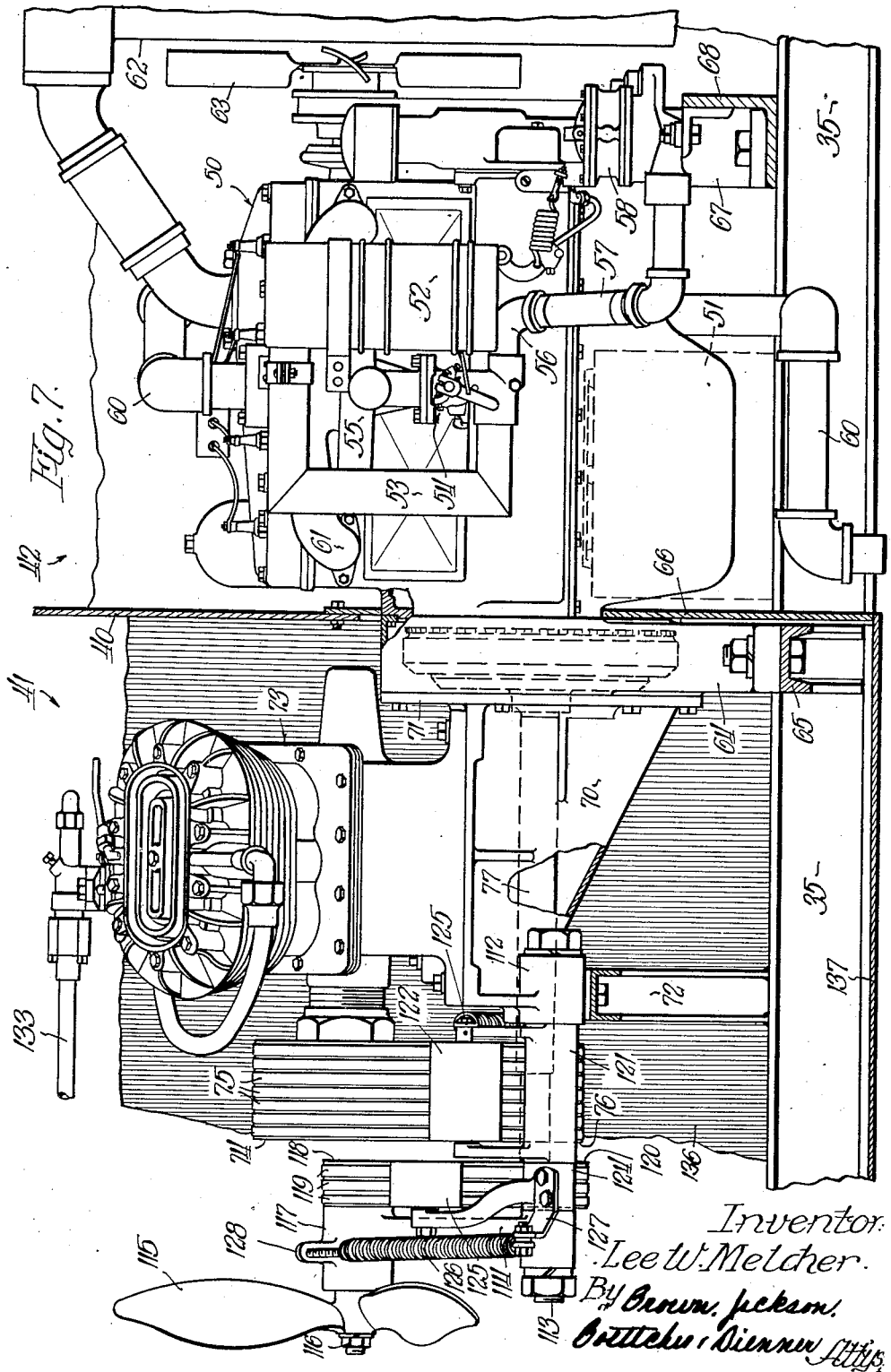

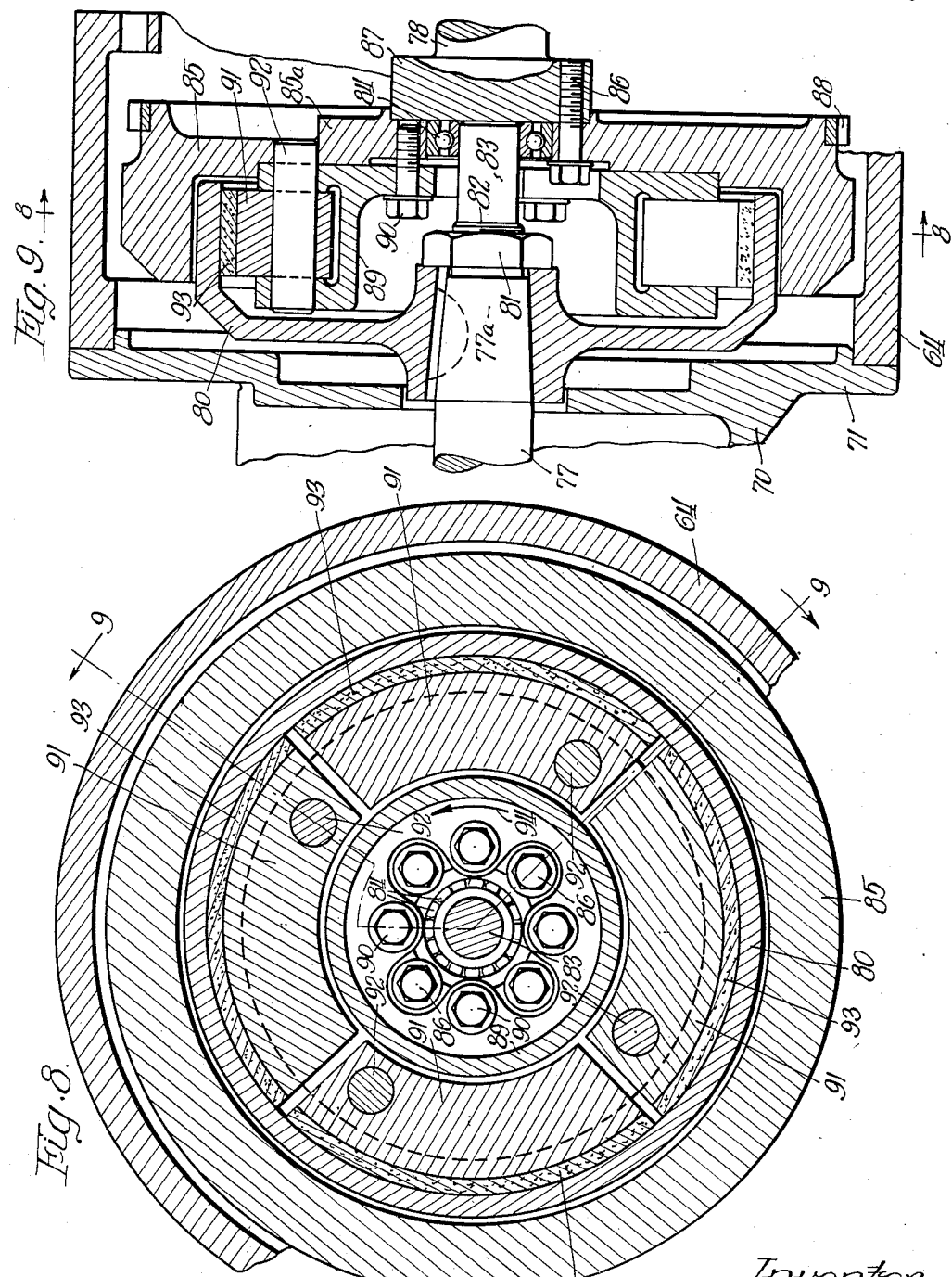

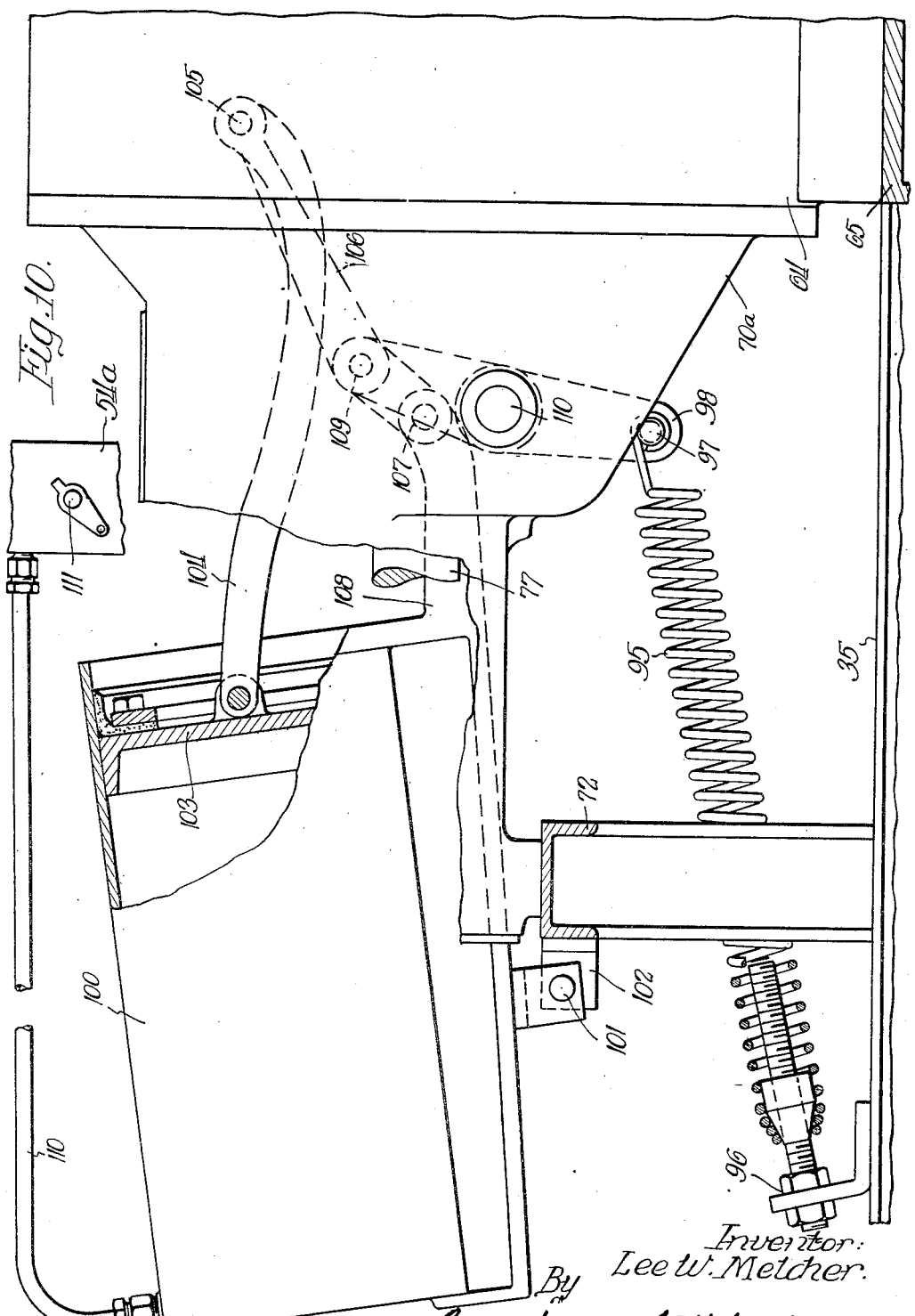

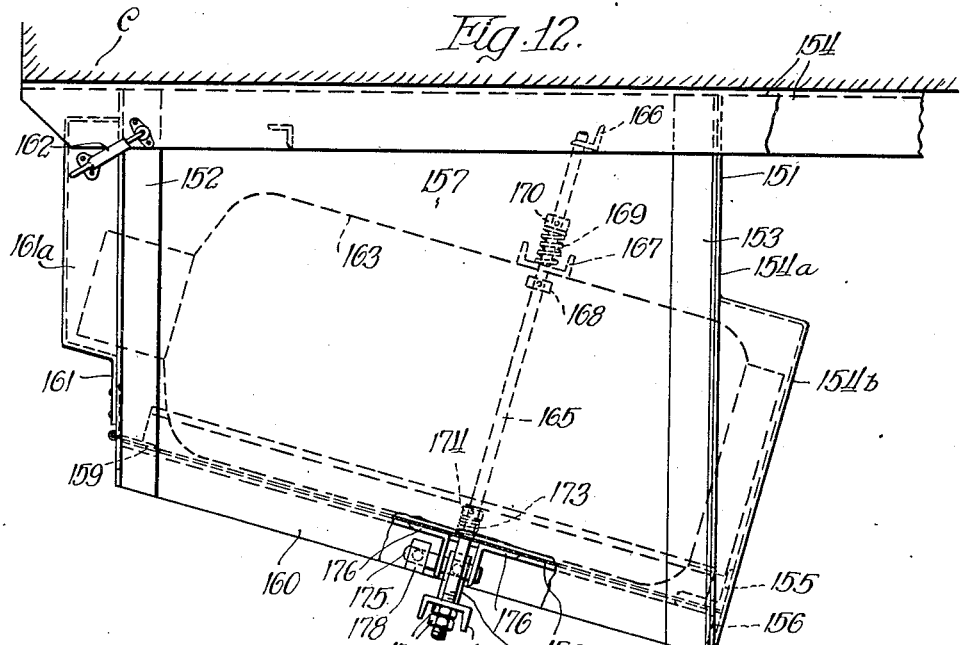
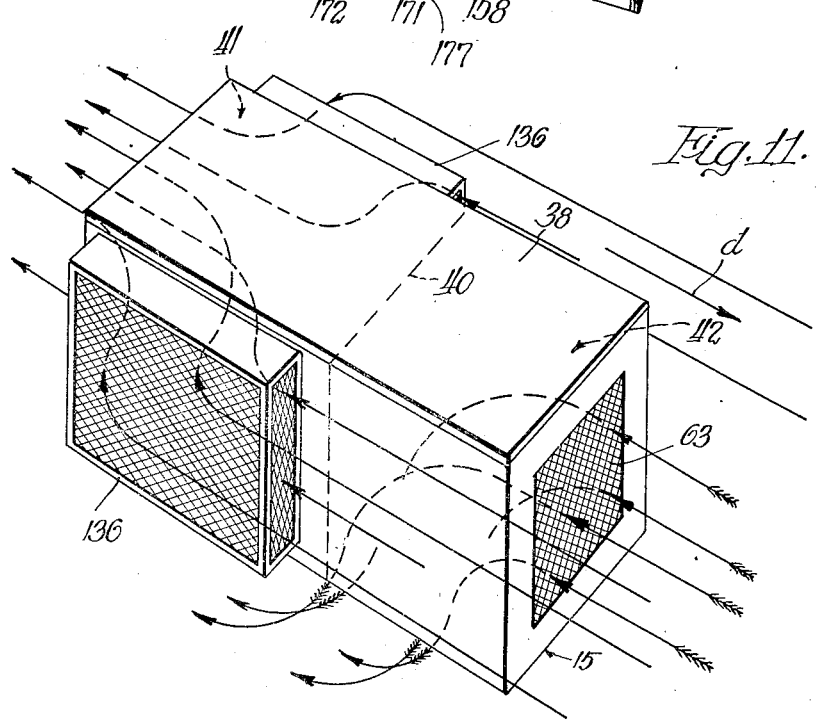

Nov. 23, 1937.    L. W. MELCHER    2,099,747
AIR CONDITIONING MEANS
Filed June 4, 1936    8 Sheets-Sheet 8
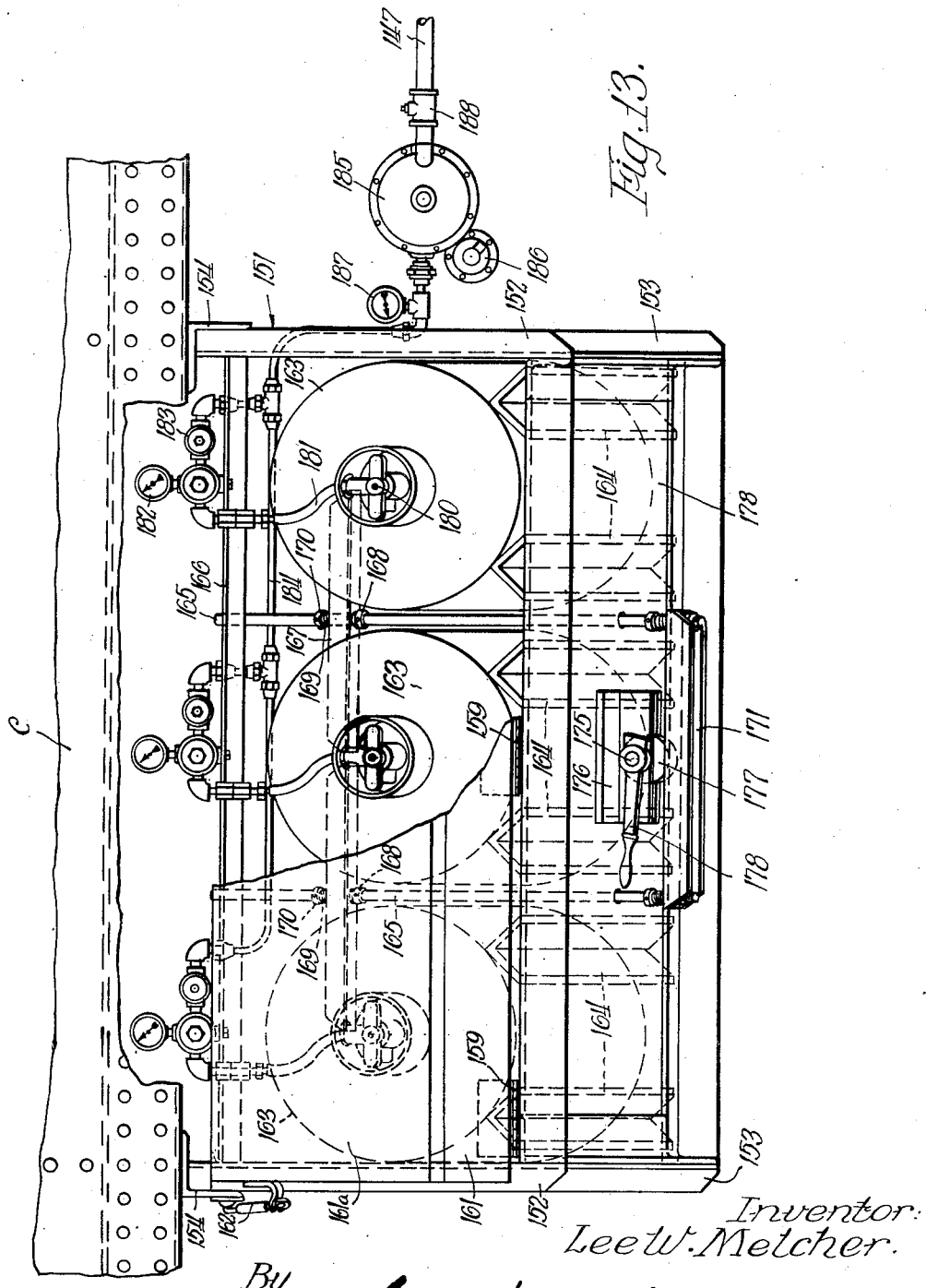

Patented Nov. 23, 1937

2,099,747

UNITED STATES PATENT OFFICE 2,099,747

AIR CONDITIONING MEANS

Lee W. Melcher, Waukesha, Wis., assignor to Waukesha Motor Company, Waukesha, Wis., a corporation of Wisconsin Application June 4, 1936, Serial No. 83,577

9 Claims. (Cl. 62—117)

This invention relates to air conditioning means, and has to do with a refrigerator unit, and associated means, particularly suitable for use with railway cars and analogous vehicles.

Air conditioning of railway passenger cars has come into extensive use. In one form of air conditioning equipment ice bunkers are provided beneath the car and loaded with ice utilized for cooling the air within the car. These bunkers are of necessity rather large and heavy, occupy considerable space, require frequent recharging with ice, and materially increase the dead load which the locomotive has to pull. Attempts have been made to replace ice bunkers by mechanical refrigerator means comprising a refrigerant compressor and associated parts, the compressor being driven by a motor, steam or electric, which derives its power, either directly or indirectly, from the locomotive. This is objectionable as imposing a considerable additional load upon the locomotive, frequently already overloaded. In certain patents granted to me, viz, No. 1,825,808, dated October 6, 1931, for Air conditioning apparatus, No. 1,905,040, dated April 25, 1933, for Air conditioning system for railway cars, and No. 1,921,257, dated August 8, 1933, for Air conditioning apparatus, I have disclosed systems employing a compressor driven by an electric motor, of the general type referred to.

The primary object of my present invention is to provide a mechanical refrigerator unit which is particularly suitable for air conditioning railway cars and which avoids the above noted objections to the heretofore known mechanical refrigerator apparatus or systems heretofore referred to. More specifically, the objects of my invention include the provision of a refrigerator unit which imposes no additional load on the locomotive, is economical to operate and maintain, can be applied to existing equipment with no major changes therein, is of simple construction and operation while being both compact and safe, has adequate capacity to meet the most severe weather conditions for long periods of time, is reliable, is instantly available for use regardless of car location or movement, is responsive to thermostat control and fully automatic in operation, is clean and quiet in its operation and transmits no vibration to the car with which it is associated, is readily accessible for inspection, servicing, or repair, and can be removed and replaced with expedition and facility.

Further objects of the invention and the various advantages and characteristics of the present unit will be apparent from a consideration of the following detailed description.

In the drawings which accompany and form a part of this specification or disclosure and in which like numerals of reference denote corresponding parts throughout the several views:

Figure 1 is an end view showing a refrigerator unit embodying the invention in connection with a railway car and illustrating in detail the means for supporting the unit so that it is shiftable from a normal or operating position under the car into a position wherein it is disposed outwardly of one side of the car and the various operating parts thereof are accessible for inspection or repair work.

Figure 2 is a fragmentary front view of the unit, the front stop of the supporting means for the unit being omitted for purposes of illustration;

Figure 3 is a plan view of the unit and the supporting tracks constituting the unit supporting means;

Figure 4 is a semi-diagrammatic inverted plan view of the railway car showing the refrigerator unit;

Figure 7 is an enlarged side elevational view of the compressor and the engine constituting the main operating parts of the unit;

Figure 8 is an enlarged transverse sectional view of the inertia clutch for clutching the engine crank shaft to the compressor drive shaft;

Figure 9 is a sectional view on the line 9—9 of Figure 8;

Figure 10 is a side view of an alternative form of clutch means for clutching the engine crank shaft to the compressor drive shaft;

Figure 11 is a semi-diagrammatic perspective view of the unit, illustrating the manner in which air flows through the housing and around the engine, condenser coils and compressor;

Figure 12 is an end view of the rack for supporting the fuel containers for the engine; and Figure 13 is a fragmentary front view of the rack and fuel containers.

Figure 5:
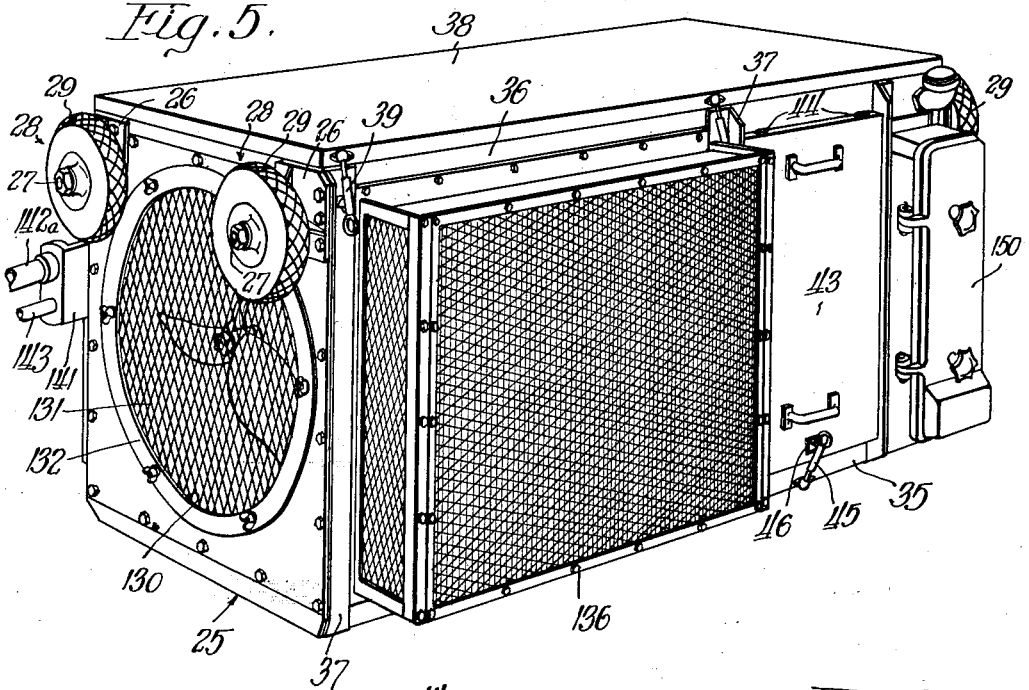
Figure 5 is a perspective view of the unit alone.

In Figures 1 and 2 of the drawings I have shown a refrigerator unit 15 embodying my invention, this unit being particularly suitable for use in air conditioning a railway passenger car C of conventional construction. Angle bars 16 are secured to car C and extend transversely thereof and beneath the car from one side of the latter. Channel tracks 17 are suspended from bars 16 by hangers 16a which are welded at the lower ends thereof to the tracks and at their upper ends to the angle bars 16. Each track comprises an inner fixed section 18 and an outer section 19 which is hinged at 20 to the outer end of the inner section 18. Each section 19 is provided at its outer end with a stop flange 21 for limiting outward movement of the unit 15 along the tracks, as will presently appear.

Each outer track section 19 is normally held in its folded or retracted position (see full line showing in Figure 1) by means of a link 22. The lower ends of links 22 are pivoted to sections 19 as at 23, and the upper ends of the links are detachably secured to angle bars 16 by bolts 24. By removing bolts 24 the outer track sections 19 may be swung outwards into their operative position (see dotted line showing in Figure 1), that is, so as to be aligned with the inner sections 18 and project therefrom outwardly beyond the adjacent side of the car C. After so positioning sections 19 the latter are secured in place by inserting bolts 24 through the upper ends of links 22 and appropriately located holes 24a in the outer ends of bars 16. The tracks are thus adapted when the sections 19 are in their operative position to project outward beyond the car and provide means whereby the unit 15 may be disposed in either one of two positions, one beneath the car and the other outward beyond the car.

Unit 15 comprises a box-like housing 25 and is disposed lengthwise of the car, that is, with the ends thereof facing toward the ends of the car. Brackets 26 are secured to housing 25 at the upper end corners thereof. Each of these brackets carries a stub shaft 27 upon which is mounted a supporting wheel 28. The wheels 28 are of the pneumatic type and comprise pneumatic rubber tires 29 of known type and comparatively large cross-sectional area. Said wheels 28 travel upon the tracks 17, serve to suspend the unit 15 from these tracks, and also facilitate movement of the unit along the tracks into either of its two desired positions. In addition, the wheels 28 provide highly efficient cushioned supporting means for the unit, effective to prevent transmission of vibration from the latter to the car. This contributes materially to elimination of vibration and noise in the operation of the unit.

The unit 15 is normally disposed beneath the car, as shown. When so disposed it is held against movement lengthwise of the tracks 17 by means of angle bracket abutments 30 which are disposed, arranged, or positioned so as to contact the wheels 29 and are releasably secured to the tracks by bolts 31. The latter pass through the horizontal legs of abutment members 30 and extend through selected holes 32 in the tracks. Each track section 17 is provided with a series of holes 32 in order to permit of adjustment of the abutments 30 and consequent variation in the position of the unit 15 beneath the car. Stop members 33, of considerable length, are welded or otherwise suitably secured to the inner sides of tracks 17 and extend beneath brackets 26 of the housing. The upper edges of the stop members 33 are spaced a short distance from the lower edges of the bracket, as shown in Figure 1. In the event of deflation of any one of the tires 29 due to puncture or other cause the subjacent member 33 limits downward movement of housing 25, thus preventing objectionable tilting of the unit 15 while also eliminating stressing and possible breakage of the unit.

The tracks 17 provide, in conjunction with the supporting wheels 28 of the unit, means whereby the latter may be moved with facility along the tracks into desired position. Outward movement of the unit along sections 19 of the tracks is limited by the flanges 21. When the unit is disposed outward beyond the side of the car it is readily accessible for inspection, repair, or replacement, if desired or necessary. Suitable flexible connections, to be later referred to more in detail, are provided between the unit 15 and other associated parts of the apparatus, these flexible connections permitting movement of the entire unit along the tracks 17 in the manner above stated, and also being detachable to permit of removal and replacement of the unit. In removing the unit, the unit is first moved into position outward beyond the car. The flexible connections heretofore referred to are then detached from the unit and the forward portion of the unit is raised so that the forward wheels thereof clear the flanges 21. Thereafter the unit is moved further outward along the track sections 19 until the rearward wheels 28 are at or adjacent to the flanges 21. As this occurs the rearward portion of the unit is raised sufficiently to clear the flanges 21 and then completely removed from the track sections 19. In replacing the unit, the operation just described is reversed. The unit may thus be removed and replaced with expedition and facility, when required, and may be supported from the car while disposed outward beyond the latter so as to be readily accessible for inspection or repair. This is of considerable practical importance as avoiding objectionable delay in inspection of the unit while greatly facilitating removal and replacement of the unit, when required.

The housing 25 comprises a lower or base frame 35 of channel iron construction, an upper frame 36 of angle iron construction, and channel uprights 37 between the frames 35 and 36. A cover 38 is removably secured upon the top of housing 25 by means of fastening devices 39 of known type. The interior of the housing is divided by a partition 40 into a compressor compartment 41 and an engine compartment 42. The latter compartment is provided at the sides thereof with removable doors 43. The latter are normally supported in closed position by inclined tabs 44 which are secured to upper frame 30 of the housing and extend through slots in the upper portions of doors 43. Securing devices 45 similar to the devices 39 are secured to lower frame 35 and cooperate with members 46 on doors 43 to hold the latter against upward movement. The cover 38 and the doors 43 are of soundproof construction in order to render the unit noiseless in operation.

An internal combustion engine 50 is suitably supported within compartment 42 and has associated therewith the usual appurtenances. The latter are mounted within said compartment and include a suitable storage battery 51. The engine and the appurtenances thereto constitute a complete power plant within the compartment 42. An air cleaner 52 of known type is connected by an air conduit 53 to the inlet of a gas carburetor 54, the stack of which is connected to an intake manifold 55 in a known manner. The fuel intake of carburetor 54 is connected by a conduit 56, including a length of flexible hose 57, to a fuel regulator and automatic shut-off 58, which, in turn, is connected to a source of supply of gaseous fuel hereinafter referred to in greater detail. The carburetor 54 and the regulator and shut-off 58 are of conventional type or design and are of such character that the fuel gas will flow to the engine only during operation of the latter. This eliminates possibility of flow of gas when the engine is not in operation.

Engine compartment 42 is open at its bottom and has an exhaust pipe which is connected to an exhaust manifold 61, extends above and across the engine to the opposite side thereof, thence downward, and then rearward to a point adjacent to the partition 20. The discharge or lower end of this pipe extends downwardly through the open bottom of compartment 42. Since the pipe 60 changes its direction a plurality of times, it is effective as a muffler for suppressing the exhaust noises, and ordinarily no further muffling thereof is required, though the exhaust pipe 60 may be connected to any suitable type of muffler if desired. The engine 50 is of the water-cooled type, and has associated therewith a radiator 61 which is mounted in the open front end of the engine compartment 42. A fan 62 is associated with engine 50 and is driven in any suitable manner thereby. This fan serves to cause flow of air through the radiator 61 into compartment 42 and over the engine 50, and thence downward through the bottom of the compartment. This flow of air is highly efficient in cooling the water within the radiator and also cooling the engine, the flow of air through the bottom of compartment 42 serving in large measure to prevent entry of dust and foreign materials into this compartment from below the unit.

A flywheel and clutch housing 64 is suitably secured, as by bolting, to the inner end of engine 50 and rests on and is bolted to a channel cross member 65 which is welded or otherwise suitably secured to the lower or base frame 35 of housing 25. Partition 40 is provided, at its lower portion, with an opening of a size to accommodate the housing 64, this opening being closed by opposed plates 66 which are shaped to fit about the adjacent portion of engine 50 and are bolted or otherwise secured to partition 40. Housing 64 provides a support for the inner end of the engine. The outer end of the engine is supported by means of a supporting member 67 which is bolted to an angle cross member 68. The latter, as shown in Figure 7, is welded to the side sills of lower or base frame 35.

A compressor supporting bracket 70 is provided with an annular base flange 71 which is bolted to the side of housing 64 which is remote from engine 50. Bracket 70 is U-shaped in cross section and tapers in width from the base flange 71. The outer end of this bracket is mounted upon a channel cross member 72 which is in the form of an inverted U and is welded or otherwise suitably secured to the side sills of the frame 35. A V-type compressor 73 is bolted to and supported by bracket 70 above the latter. This compressor is of conventional type and comprises a drive shaft and shaft operated pistons.

A pulley 74 with a plurality of V grooves is secured upon the outer end of the drive shaft of compressor 73. This pulley is connected by a plurality of V belts 75 to a multiple grooved V belt pulley 76 on the forward end of a countershaft 77 which has bearings in the forward end of bracket 70. This countershaft extends through bracket 70 and beneath compressor 73 and is co-axially disposed with respect to crankshaft 78 of engine 50 (Figure 9). Disposing the shaft 77 in this manner provides a compact arrangement of parts which is conducive to reducing the overall dimensions and weight of the unit as a whole.

It is desirable that driving connection between the engine and the compressor be not established until the engine has come up to its normal operating speed, thus avoiding necessity for starting the engine under load and assuring most efficient operation of the compressor. In order to accomplish this result, I provide suitable means for clutching the shafts 77 and 78 together when the engine has attained the desired predetermined speed of operation, this clutch means being responsive to engine speed. I have shown, in Figures 8 and 9, an inertia clutch suitable for this purpose. Shaft 77 extends through base 71 of bracket 70 into the flywheel and clutch housing 64, and is there provided with a clutch drum 80 which is keyed upon a tapered portion 77a of shaft 77 and held against movement toward the inner end of this shaft by a nut 81 on a threaded stud 82. The extreme end portion of shaft 77, that is the portion beyond the screw stud 82, is reduced to provide a stud 83 which is carried by ball-bearings 84 in the hub 85a of a flywheel 85. The latter is secured by bolts 86 to a cylindrical head 87 on the contiguous end of engine crank shaft 78. Flywheel 85 extends about clutch drum 80 concentrically therewith and carries a gear ring 88 with which meshes the pinion of the engine starter, during the starting operation. A clutch shoe carrier 89, of channel cross section, is secured by bolts 90 to flywheel 85 and extends therefrom into the clutch drum 80 in concentric spaced relation thereto. A plurality of clutch shoes 91, of segmental shape, are pivotally connected by pins 92 to carrier 89 for movement therewith, each shoe being provided at its outer circumferential surface with a covering of any suitable friction material 93. In Figure 8, the direction of rotation of the engine crank shaft 38 is indicated by the arrow 94. It will be noted that each of the clutch shoes 91 is pivoted to the carrier 89 at a point adjacent to the following end of the shoe with reference to the direction of rotation of the carrier 89. During starting of the engine, and while it is coming up to the required predetermined speed, the clutch shoes 91 will travel around the flange of clutch drum 80 in contact therewith but will not be urged outward toward the flange of the drum with sufficient pressure to cause any clutching action. As the speed of rotation of the engine crank shaft 38 increases, clutch shoes 91 will be urged outward with increasing pressure, due to centrifugal force, and when the engine reaches the desired predetermined speed, the outward pressure of the shoes against the flange of clutch drum 80 becomes sufficient to cause the shoes to clutch the drum to the shoe carrier 89, thus establishing driving connection between the engine and the compressor through shaft 77 and the multiple V-belt drive between this shaft and the compressor shaft. Having the pins 92 at the trailing ends of the clutch shoes causes a binding effect between the latter and the clutch drum 80, when the shoes are urged outward with sufficient pressure to initiate the clutching action, thus assuring quick completion of the clutching operation and also preventing slippage between the clutch drum and the clutch shoes so long as the engine is operating at the desired predetermined speed. If the speed of the engine falls appreciably below this predetermined speed, the outward pressure exerted by the clutch shoes is insufficient to maintain them in clutching engagement with the drum 80, with the result that this drum, and consequently shaft 77, is quickly declutched from the engine crank shaft 78. Upon the engine again attaining its proper operating speed, the two shafts will be clutched together in the manner previously described.

In Figure 10 I have shown alternative means for clutching the engine crank shaft to shaft 77. Compressor supporting bracket 70a is appropriately formed to provide, in conjunction with housing 64, an enclosure or housing for a disc clutch of known type. Such a clutch includes cooperating friction discs, certain of which are spring loaded in a suitable manner, and thereby urged into clutching engagement with other cooperating discs. The clutch has associated therewith an operating arm which, when turned in one direction, counteracts the pressure of the loading springs, thereby releasing the clutch, and, when turned in the opposite direction, permits the loading springs to function for applying the clutch and thereby clutching the discs together. Preferably I use a clutch of the type which is disclosed in Patent No. 1,839,590, issued January 5, 1932, to Harold V. Reed, for Friction clutch.

A tension spring 95 is suitably anchored at one end, at 96, to base frame 35 of the unit, the other end of this spring being attached at 97 to the lower end of clutch control arm 98. Spring 95 urges arm 98 in counter-clockwise direction, and is of sufficient strength to overcome the force exerted by the loading springs of the clutch, thus normally maintaining the clutch released, so that the shaft 77 is declutched from the engine crank shaft 78.

A cylinder 100 is pivotally mounted at 101 on a bracket 102 which is welded or otherwise suitably secured to supporting member 72. Cylinder 100 receives a piston 103 to the outer face of which is pivoted a link 104. The outer end of this link is pivoted at 105 to a link 106 which is pivoted at its lower end, at 107, to an arm 108. The latter is rigid with cylinder 100 and extends forwardly therefrom. Link 106 is pivoted, at 109, to the upper end of arm 98, and the latter is secured upon the outer end of a shaft 110 which is rotatably mounted in suitable bearings in the support 70a. Cylinder 100 is interiorly connected at its rear end to carburetor stack 54a by means of a tube 110 which may be, in part, or in whole, flexible. The point of connection of the tube 110 to the carburetor stack 54a is at the low pressure side of, that is, above the butterfly valve. The position of such valve is indicated by shaft 111 thereof.

Spring 95 serves to maintain the clutch normally disengaged, with shaft 77 declutched from the engine crank shaft 78. The engine, when starting, is free of load, and soon reaches the desired operating speed. At this speed the butterfly valve is partially closed, thus creating a partial vacuum within the stack 54a and exhausting air from cylinder 100, with the result that piston 103 is forced inwardly of the cylinder, causing corresponding inward movement of link 104. This movement of link 104 serves to swing arm 98 in a counter-clockwise direction, overcoming the tension of spring 95, with the result that the clutch is quickly engaged by the loading springs thereof, thus clutching the motor crank shaft to shaft 77. In the event the engine falls appreciably below the predetermined operating speed, the butterfly valve moves toward open position, the partial vacuum within stack 54a above this valve is reduced, and spring 95 turns arm 98 in clockwise direction, moving piston 103 outward in cylinder 100 and declutching shaft 77 from the engine crank shaft 78. The movement of the butterfly valve referred to may be accomplished in any suitable manner, and I contemplate using, in conjunction therewith, an engine governor of known type for maintaining substantially constant speed of the engine. The clutch means of Figure 10, like that of Figures 8 and 9, is responsive to engine speed. The cylinder 100, spring 95 and associated levers are suitably disposed at one side of the support or bracket 70a which, in addition to serving in part as a housing for the clutch, supports the compressor in the same manner as the bracket 70 of Figure 7.

The compressor supporting bracket 70 is provided, at each side and with a rearwardly projecting collar 112. Supporting rods 113 are suitably secured in the collars 112 and support adjacent their outer or rear ends a fan bracket 114 upon which is rotatably mounted a fan 115. Fan 115 is suitably secured upon a fan shaft 116 which is rotatably mounted in bearing sleeve 117 at the upper end of bracket 114. A multiple grooved V-pulley 118 is suitably secured upon the inner end of shaft 116 and is drawn by a plurality of V-belts 119 from a multiple grooved pulley 120 which is suitably secured upon the outer end of shaft 77. The fan 115 is thus driven from shaft 77 during operation of the compressor. A belt tightener 121 is rotatably mounted upon one of the rods 113, and the roller 122 thereof is pressed against the V-belts 75 by a tension spring 123 which is attached at one end to the tightener 121 and anchored at its other end to the bracket 70. A second belt tightener 124 is rotatably mounted upon one of the rods 113 between fan bracket 114 and belt tightener 121, and has a roller 125 which is held pressed against the belts 119 by a tension spring 126 having its lower end secured to an anchor plate 127 on the hub of tightener 124 and the upper end thereof anchored to a lug 128. The latter is formed integrally with hub 117 of the fan bracket 114.

The fan 115 is disposed in alignment with a circular opening 130 at the outer end of the compressor compartment 41. This opening is covered by a protecting grill 131 which is of reticulated construction and has an annular rim 132. The latter is secured to the end wall of housing 25 by bolts and associated wing nuts. The blades of fan 115 are so disposed that when this fan is driven during operation of the compressor, it acts as a blower for forcing air rearwardly through opening 130.

The compressor may be used in conjunction with an expansion coil of a heat exchange unit in a system utilizing a suitable liquid, such as brine, and means for circulating the same, or with a cooling coil in contact with which the air to be cooled is passed. Both of these systems are known in the art and need not be illustrated nor described in detail. A refrigerant return or low pressure tube is suitably connected to the compressor for supplying thereto the expanded refrigerant in gaseous form. The refrigerant is compressed within the compressor, and thence flows into and through condensing coils, from which latter the liquid refrigerant flows to a receiver, and thence, through a suitable expansion valve, into an expansion or cooling coil, thus completing the circuit. The connections between the expansion or cooling coil, the refrigerant return pipe, and compressor, and between the latter and the condenser coils and cooling coil may be of any suitable or preferred type, are well known in the art, and need not be illustrated nor described in greater detail. Suffice it to state that such connections are provided.

A fin-equipped condenser coil 135 is disposed at each side of the compressor compartment and is enclosed within a casing 136 of box-like formation. The major portions of the casings are of reticulated grill work construction to permit of ready flow of air over the coils. These coils project beyond the sides of housing 25, and the sides of the compressor compartment, at the areas thereof corresponding to the condenser coils, are otherwise open to atmosphere. The bottom of this compartment, however, is closed in a suitable manner, as by means of a sheet metal plate 137, shown in Figure 7. Housing 25 of unit 15 is open at its front end, except for the engine radiator 63 which is guarded by bars 138. The latter extend across and are welded or otherwise suitably secured to the frame of the housing. The elements of the unit are thus disposed to best advantage to obtain the maximum cooling effect by flow of air over and about the unit during travel thereof with the associated railway car C.

Referring to Figure 11, the direction of travel of the car is indicated by the arrow $d$. With the car travelling in the direction indicated, air will flow through the radiator 63 into the engine compartment, over and about the engine and then downwardly through the bottom of this compartment. This supplements the action of the engine fan and materially increases the cooling effect with reference to the water within the radiator and engine. Since the condenser coils 135 and the casings 136 therefor project beyond the sides of the housing, air will flow into the casings and over the coils lengthwise of the unit. Further, since the fan 115 forces air rearwardly through opening 130, air in large volume will be drawn through the condenser coils into the compressor compartment, and then flow over the compressor and thence through the opening 130. This flow of air is indicated by the arrows in Figure 11, from which it will be clear that disposing the unit in the manner stated materially facilitates cooling of the unit, particularly of the condenser coils. If the car be travelling in the opposite direction to that indicated in Figure 11, flow of air over the condenser coils is facilitated by travel of the car, and air flow through the compressor compartment and the engine compartment is provided for by the fans associated with the compressor and the engine, respectively.

Figure 6:
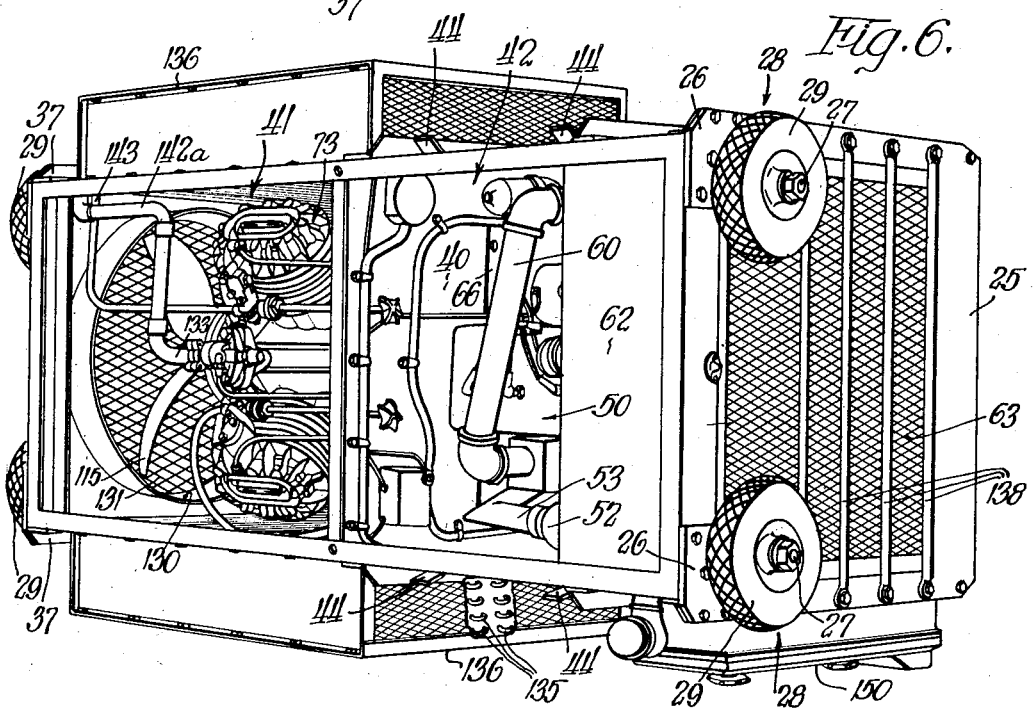
Figure 6 is a top perspective view of the unit with the housing cover removed.

In Figure 3 I have shown a flexible hose 140. The latter passes through a support 141 on housing 25 and connects a pipe 142 leading from the cooling or expansion coil (not shown), to the low pressure or intake pipe 142a. This pipe as shown in Figure 6 is connected to the intake or low pressure side of the compressor. A smaller hose 143 connects the outlet from the condenser coils to a refrigerant receiver (not shown) which may be disposed in any suitable location, either within or beneath the car C. A suitable bracket 144 which is mounted beneath the car, serves to support the hoses 140 and 143 at the ends thereof remote from the unit. At the other end of the unit I provide a flexible hose 145 which is connected at one end to a pipe 146 leading to the fuel regulator and automatic shut-off 58. The other end of hose 145 is connected to a pipe 147 which extends or leads from a source of supply of gaseous fuel. I also provide a flexible cable 148 having detachable connection to the unit, this cable extending from a thermostat which is disposed within the car and is responsive to the temperature therein. The thermostat and cable 148 provide temperature responsive means for automatically controlling operation of the engine in any well known manner. The provision of the flexible hoses and the flexible cable permit of movement of the unit along the supporting tracks therefor into and out of its operative position. The thermostatic control of the engine is of a type known in the art, and need not be illustrated nor described in detail. In practice I also provide automatic means for preventing overheating of the engine, refrigerant pressure control means, and means for controlling charging of the storage battery for the engine starter. These automatic controls are known, in themselves, form no part of my invention, and need not be illustrated nor described in detail. It is sufficient to note that automatic controls of suitable type may be provided where necessary or desired. I also prefer to provide pressure gauges, these gauges and the automatic control means, in part, being mounted upon a control panel 150 which is conveniently disposed at one side of the housing 25.

A fuel container supporting rack 151 is disposed beneath the car at the opposite side thereof from unit 15. This rack comprises front and back frames 152 and 153 which are of angle iron construction and are welded or otherwise suitably secured to angle bars 154 on the bottom of the car C. A closure member 154a with an offset portion 154b, is suitably secured to back frame 153 and to angle cross members 155 and 156 of the latter frame. The ends of the frames are connected by end plates 157, and a bottom plate 158 is secured to angle members 155 and 156 and to an angle cross member 159 of the front frame 152, bottom plate 158 being also secured to end angle members 160 connecting the frames 152 and 153. It will be noted that the angle members 160 are inclined downward and inward of rack 151 and also that plate 158 is similarly inclined. A closure member or door 161 with an offset portion 161a, is hinged at its lower end to angle bar 159. Door 161 is releasably secured in closed position by fastening devices 162 and gives access to the rack for insertion and removal of cylindrical fuel containers 163.

Container supporting members 164 are welded or otherwise suitably secured upon the upper face of bottom plate 158 and extend from front to back of the rack. They are inclined similarly to the rack bottom and are disposed in pairs for reception of the containers 163. The closure member 154a serves to limit rearward movement of the containers in the rack, and door 161 serves to close the front of the rack while permitting of ready removal and replacement of the containers. Two rods 165 are slidably mounted, at their upper ends, through an angle brace member 166 which connects the angle bars 154 and is welded or otherwise suitably secured thereto. A channel clamping bar 167 is loosely mounted upon rods 165 above collars 168 which serve to limit downward movement of bar 167 with respect to the rods. Coil compression springs 169 are mounted about rods 165 and confined between bar 167 and upper collars 170 on the rods. This provides means for limiting downward movement of the clamping bar relative to the rods, while yieldingly resisting relative upward movement of this bar. A channel pressure bar 171 is loosely mounted upon the lower ends of rods 165 and is confined against relative downward movement by nuts 172 on the bars. Coil compression springs 173 are mounted around the lower ends of the rods 165 and are confined between bottom plate 158 of the rack and collars 174 in said rods 165. The rods 165 pass through bottom plate 168 and are guided thereby. A stub shaft 175 is rotatably mounted in angle brackets 176 on the underface of plate 158. A cam 177 is secured eccentrically upon stub shaft 175, between brackets 176, and presses against the bight portion of pressure bar 171. An operating lever 178 is secured upon the forward end of stub shaft 175 for turning cam 177 into desired position. With lever 178 in the position shown in Figures 12 and 13, pressure bar 171 is held depressed by the cam 177, and the clamping bar 167 is yieldingly held in contact with the containers 163 so as to confine the latter against upward movement relative to the supporting members 164. By turning lever 178 counter-clockwise, as viewed in Figure 13, through an arc of 180°, the pressure on bar 171 is released, and rods 165 are moved upward by springs 173, thus raising the clamping bar 167 and releasing the containers 163 for quick removal or replacement thereof.

The containers 163 are provided with adjustable valves 180 the outlets or discharge openings of which are connected to lengths 181 of flexible hose or tubing. The lengths are connected through suitable fittings, to pressure gauges 182, globe valves 183, and thence to a manifold 184. The three containers supported in the rack 151 are thus suitably connected to a common pipe or manifold 184. This manifold has its outlet end connected to a pressure regulator 185, from which extends pipe 147, previously referred to, for supplying fuel to the engine. The pressure regulator 185 has associated therewith a safety release valve 186. A pressure gauge 187 is connected to the inlet side of regulator 185 for indicating the pressure in manifold 184, and pipe 147 is provided with a suitable valve 188. The pressure regulator and associated parts may be disposed in any suitable location, but I contemplate providing a casing therefor which is mounted upon the rack 151.

Each of the fuel containers or cylinders 163 contains, when full, twenty-three and one-half gallons of a gas of the methane series, preferably propane. This gas has an exceptionally high heat value, approximately 21,600 B. t. u.'s per pound, and has an octane rating of 125, which renders possible the use of an engine having a compression ratio of nine to one, which is conducive to adequate power capacity while materially reducing the weight of the engine for a given power output. Propane is readily liquefied by cold and pressure, is produced on a commercial scale for various uses, and is of low cost, while possessing the advantage that it forms a true gas mixture, produces no crank case dilution, requires no choking of the engine for starting, and produces an absolutely clear exhaust free of all injurious or poisonous vapors or gases. It will thus be seen that there are certain definite advantages in the use of propane, or a gas having similar characteristics, as fuel for an internal combustion engine of a refrigerator unit used in connection with a railway car. The fuel contained within the three cylinders 163 is ample to enable seventy-two hours' continuous operation of the engine of the unit. Since a unit of this character is normally operated intermittently, the fuel supply is adequate for a trip of considerable length. The fuel cylinders can be removed and replaced with expedition and facility, if and as required. A further advantage resulting from the use of propane as engine fuel is that this gas evaporates instantly at atmospheric pressure so that, in the event of leakage, no puddles can form with resulting fire hazard. The fuel cylinders are placed in the rack and are not opened until all the connections to the distributing line have been made tight, a further safeguard against leakage.

The refrigerator unit is of such exceptionally compact construction that when disposed beneath the car ample clearance is provided. Further, this unit, including the fuel cylinder rack and the fuel cylinders therein, is of materially less weight than the ice bunkers which have heretofore been used in the air conditioning systems of many railway cars. The unit possesses the further advantages that it is entirely self-contained, imposes no additional power load on the locomotive, and may be moved with expedition and facility into position beneath the car, or into position outward beyond the car, while supported from the latter, as conditions may require. While the unit of my invention is particularly suitable for use with railway cars and like vehicles, it is also well suited, in certain aspects, for many other uses.

The invention is not to be understood as restricted to the details set forth, since these may be modified within the scope of the appended claims without departing from the spirit and scope of the invention.

What I claim is:

1. In combination with a vehicle having cooling means therefor, of a mounting connected to and suspended from the bottom of the vehicle, a refrigerator unit comprising a compressor for supplying compressed refrigerant to the cooling means and a prime mover for driving the compressor, and supported by the mounting so that it is bodily shiftable from a normal operating position wherein it is disposed directly beneath the bottom of the vehicle into a position wherein it is disposed outwardly of the vehicle and the compressor and prime mover are readily accessible, and means for releasably holding the unit in its operating position.

2. In combination with a vehicle having cooling means therefor, of a pair of tracks suspended from and positioned in a transverse manner beneath the bottom of the vehicle and having extension sections at one end thereof adapted to project beyond one side of the vehicle, a refrigerator unit comprising a compressor for supplying compressed refrigerant to the cooling means and an engine for driving the compressor, supported in a suspended manner from the tracks and so that it is shiftable laterally of the vehicle from a normal operating position wherein it is disposed beneath the vehicle bottom into a position wherein it is supported by the extension sections outwardly of said one side of the vehicle and the compressor and engine thereof are readily accessible, and means for releasably holding the unit in its operating position.

3. In combination with a vehicle having cooling means therefor, of a pair of tracks suspended from and positioned in a transverse manner beneath the bottom of the vehicle and having at one end thereof extension sections pivotally connected so that they may be swung outwardly from beneath the tracks into an operative position wherein they project beyond one side of the vehicle and form continuations of said tracks, a refrigerator unit for the cooling means comprising a compressor and a compressor driving engine, and supported by wheels on the tracks so that when the extension sections are in their operative position it is shiftable laterally from a normal operating position wherein it is disposed directly beneath the vehicle bottom into a position wherein it is supported by the extension sections outwardly of said one side of the vehicle and the compressor and engine thereof are readily accessible, and means associated with the tracks for releasably holding the unit in its operating position.

4. In combination with a wheel supported vehicle having cooling means therefor, of a pair of parallel tracks connected to and suspended from the bottom of the vehicle, a refrigerator unit for the cooling means comprising a compressor, a prime mover for driving the compressor and a box-like housing for the compressor and prime mover, and having at certain corners of the housing wheels with resilient tires mounted on the tracks and coacting therewith to suspend the unit so that it is bodily shiftable along the tracks, and means for releasably holding the unit in place after shift thereof into a certain position with respect to the tracks.

5. In combination with a vehicle having cooling means therefor, of a pair of tracks suspended from and positioned in a transverse manner under the bottom of the vehicle, a refrigerator unit for the cooling means comprising a compressor, an internal combustion engine for driving the compressor and a housing around the compressor and engine, and having wheels with resilient tires therearound, carried by the housing and mounted on the tracks so that the unit is bodily shiftable along the tracks and laterally of the vehicle, flexible refrigerant connections extending between the compressor and the cooling means and adapted without disconnection thereof to permit shift of the unit along the tracks, a supply of fuel carried by the vehicle in proximity to the unit, and a flexible fuel connection extending between said supply and the engine and also adapted to permit shift of the unit along said tracks.

6. In combination with a vehicle having cooling means therefor, of a pair of parallel tracks spaced beneath and connected to the bottom of the vehicle and having extension sections at one end thereof whereby they may be extended outwardly beyond the vehicle, a refrigerator unit for the cooling means comprising a compressor and an internal combustion engine of the gas consuming type for driving the compressor, and supported by the tracks so that it is shiftable bodily from a normal operating position beneath the vehicle bottom into a position wherein it is supported by the extension sections outwardly of the vehicle and the compressor and engine thereof are readily accessible, flexible refrigerant connections extending between the compressor and the cooling means and adapted without disconnection thereof to permit shift of the unit back and forth between said positions, a supply of gaseous fuel carried by the vehicle in proximity to the unit, and a flexible fuel connection extending between said supply and the engine and also adapted to permit shift of the unit back and forth between said positions.

7. In combination with a vehicle, a refrigerator unit comprising an elongated box-like housing extending under and lengthwise of the vehicle bottom and having side openings and an end opening at one end portion thereof, an engine mounted in the other end portion of the housing, a compressor disposed in said one end portion of the housing and connected for drive by the engine, a pair of condenser coils connected to and disposed at opposite sides of the compressor and projecting through and outwardly of said side openings, and a fan associated with the compressor for causing air to flow through the end opening and over the coils.

8. In combination with a vehicle having cooling means therefor, a refrigerating unit adapted for use in connection with said means and comprising an elongated box-like housing extending under and lengthwise of the vehicle bottom and having a substantially centrally disposed transverse partition dividing it into two compartments and also having an end and a bottom opening for one of the compartments and an end opening and side openings for the other compartment, an internal combustion engine mounted in said one compartment, a radiator for the engine extending across the end opening for said one compartment, a suction type fan positioned between the engine and the radiator adapted to draw air through the latter into said one compartment for downward passage around the engine and through said bottom opening, a compressor disposed in the other compartment and connected for drive by the engine, a pair of condenser coils connected to and disposed at opposite sides of the compressor and projecting through and outwardly of the side openings, and a blower type fan disposed across the end opening of said other compartment and operative during drive thereof to cause air to flow over the coils and thence through said second compartment and out said end opening of the latter.

9. The combination with a vehicle having cooling means therefor, of a refrigerator unit for the cooling means disposed beneath the bottom of the vehicle and comprising a compressor, an internal combustion engine of the gas consuming type for driving the compressor and a housing extending around the compressor and engine and resiliently suspended from the vehicle bottom, means suspended from the bottom of the vehicle in close proximity to the unit and having a fuel container secured removably therein, means including a flexible connection for supplying fuel from the container to the engine, and flexible refrigerant connections between the compressor of the unit and the cooling means.

LEE W. MELCHER.